Feb. 24, 1970  G. S. MacLEOD ET AL  3,496,703
BACKPACK AIR-CONDITIONING APPARATUS
Filed Oct. 9, 1967  4 Sheets-Sheet 1

GRAEME S. MAC LEOD
PAUL R. MAGUIRE
WILLIAM A. WESTHEAD
INVENTORS.
WHANN & McMANIGAL
Attorneys for Applicants
BY Feb. 24, 1970     G. S. MacLEOD ET AL     3,496,703
BACKPACK AIR-CONDITIONING APPARATUS
Filed Oct. 9, 1967     4 Sheets-Sheet 3
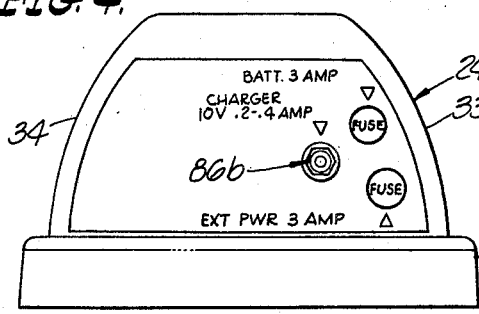
FIG. 4.
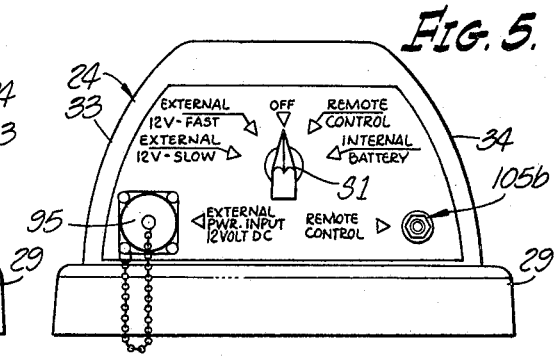
FIG. 5.
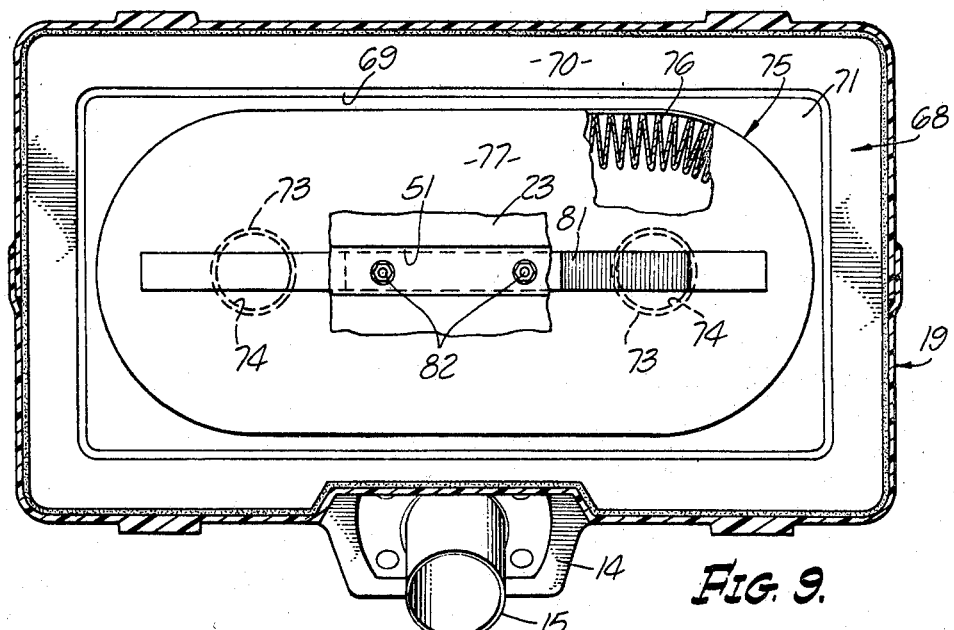
FIG. 9.
FIG. 10.
GRAEME S. MAC LEOD
PAUL R. MAGUIRE
WILLIAM A. WESTHEAD
INVENTORS.
WHANN & McMANIGAL
Attorneys for Applicants
BY GRAEME S. MAC LEOD
PAUL R. MAGUIRE
WILLIAM A. WESTHEAD
INVENTORS.
WHANN & MCMANIGAL
Attorneys for Applicants
BY

United States Patent Office 3,496,703
Patented Feb. 24, 1970

3,496,703
BACKPACK AIR-CONDITIONING APPARATUS
Graeme S. MacLeod, Glendale, Paul R. Maguire, Los Angeles, and William A. Westhead, Burbank, Calif., assignors to Rite Hardware Manufacturing Co., Glendale, Calif., a corporation of California
Filed Oct. 9, 1967, Ser. No. 673,630
Int. Cl. B01d 47/00
U.S. Cl. 55—234        7 Claims

ABSTRACT OF THE DISCLOSURE

A portable backpack self-contained air-conditioning apparatus including a housing internally divided into separate compartments with an ambient air inlet at the top and an air outlet at the bottom adapted for connection with an air delivery hose, a cap and canopy on the housing coacting to provide an air inlet in which a first filter is positioned to initially clean the inflow of air to a compartment containing air circulating means driven by a motor arranged to be energized from a battery in the compartment, the air being delivered therefrom to another filter in a filter compartment accessible upon removal of the cap and canopy, the air flow from the filter compartment being into a bottom evaporator compartment which contains a material saturable by water which may be introduced into the compartment through the connection for the air delivery hose. The electric motor is selectively connectible with the battery or an external source, and is provided with accessible switching and speed controls, further provision being made for connecting the battery with an external charging source.

BACKGROUND OF THE INVENTION

The present invention relates generally to the field of air treatment.

The invention is particularly concerned with apparatus for the protection of workmen and other personnel who are required to work under adverse environmental conditions which may constitute a hazard not only to their health, but also may seriously reduce their working efficiency. Such environments include heavy concentrations of dust, dirt, pollen, chaff, toxic chemicals, smoke, fumes and ultra-fine dust such as may be encountered by workmen in the fields of agriculture, mining, earth moving, construction and many other industries. Under the constant bombardment of these irritants, a person's lungs, throat and eyes may be adversely affected and even may suffer serious and permanent impairment under repeated exposure. In addition the air-borne particles adversely affect a person's well-being and can materially reduce his efficiency.

Heretofore, it has been the usual practice under such adverse environmental conditions to utilize apparatus which will permit the worker to operate in contaminated atmospheres. However, in the main the design and construction of the previously available apparatus has been such that the worker did not have entire freedom of movement, since it was necessary in the case of some apparatus to carry a heavy air supply tank or tether an electric cord or compressed air line which limited and impeded his movements.

In the present invention, the foregoing inherent disadvantages of the formerly available apparatus have been solved by providing a portable self-contained and self-powered air treating apparatus of relatively light weight, of the order of fifteen pounds, and which can be worn as a backpack by the worker and furnish conditioned air through a short hose connection to his protective helmet, thus permitting a freedom of movement which was heretofore not possible.

SUMMARY OF THE INVENTION

The present invention relates generally to air-conditioning apparatus, and is more particularly concerned with apparatus for such purpose, which can be worn as a backpack by a worker in contaminated ambient air to provide breathable air and permit freedom of movement in the working area.

One object of the invention is to provide air conditioning apparatus of light weight construction which is susceptible of attachment to the wearer's body as a backpack unit for supplying conditioned ambient air to a protective helmet.

A further object of the invention is to provide a backpack portable air-conditioning apparatus in which an electrically driven air circulating device and its battery power source are mounted in a separate upstream compartment near the air inlet of the apparatus housing so as to be isolated from a downstream main filter compartment and moisture in an evaporator cooling compartment at the air delivery end of the housing.

Another object is to provide a compact portable air-conditioning unit in which the air moving and air-conditioning components are arranged in an upright housing having an inlet at the top for ambient contaminated air, and an outlet at the bottom for cleaned and cooled air.

Still another object is to provide a light weight portable self-contained air-conditioning apparatus as a backpack unit to be carried while working, the unit having an easily replaceable pre-filter for filtering the entering air prior to its reaching the air circulating means, and a main filter for further filtering the air prior to its being delivered for use.

A further object is to provide portable air-conditioning apparatus of the herein described type which contains an evaporative cooling section in which the air temperature is reduced below that of the ambient air prior to delivery for use.

It is also an object to provide air-conditioning apparatus having a motor driven air circulating fan, the motor being energizable from a carried rechargeable battery, and/or in the alternative being energizable from an exterior source, if desired.

It is likewise an object of the herein described invention to provide an air conditioning unit as a backpack, wherein ambient air is circulated through the unit for treatment by means of a motor driven air circulating fan, and in which the controls therefor are located in readily accessible positions on the unit housing.

Briefly, the air-conditioning apparatus for accomplishing the above objects comprises an upright housing carried by a backpack frame structure in an upright position, the apparatus being housed within an upright container having top inlet openings at its opposite sides for contaminated ambient air. The air is drawn in by means of a motor driven circulating fan through a pre-filter at the fan inlet. The fan outlet discharges the pre-filtered air into a filter compartment containing a filter adapted to remove organic vapors, smoke, odors and/or ultra-fine articles. The air leaves this filter and is conducted to an evaporative compartment containing a water saturable material which is adapted to cool the filtered air by as much as 30° F. depending upon outside humidity. The cooled air leaves the housing through an air outlet adapted for connection with an air delivery hose. This outlet also enables the replenishment of water in the evaporative compartment, when necessary. The control components for the motor which drives the circulating fan, and for connecting the power source to an external source or charging circuit for the battery are mounted on the opposite sides of the housing just below the air inlet openings.

Further objects and advantages of the invention will be brought out in the following part of the specification wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 4 is an elevational view of one end of the cap member of the housing, showing the mounting of electrical control elements thereon;

FIG. 5 is a similar view of the other end of the cap member;

FIG. 9 is a transverse sectional view through the filter compartment of the housing, taken substantially on line 9—9 of FIG. 3; and FIG. 10 is a view schematically illustrating the control circuitry for the fan motor of the air circulating means.

DESCRIPTION OF THE PREFERRED EMBODIMENT

Figure 1:
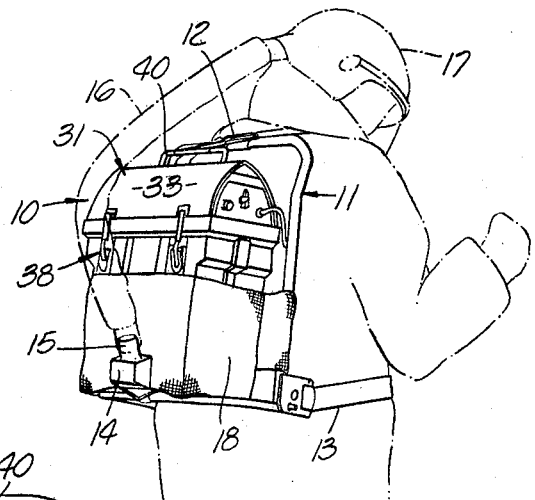
FIG. 1 is a perspective view of an air-conditioning unit according to the present invention, shown in its carrying position on the back of a user indicated in phantom lines.

Referring more specifically to the drawings, for illustrative purposes, the air-conditioning apparatus according to the present invention is disclosed in FIG. 1 as comprising a conditioning unit 10 which is mounted upon a mountainer-type pack frame 11 having the usually provided attaching straps as illustrated at 12 and 13 for securing the pack frame to the body of the user, and thus permitting the conditioning unit to be worn as a backpack while freely moving about and working in a contaminated atmosphere. The unit is provided with a bottom air outlet connection 14 having a hose attaching nipple 15 which is connectible with a delivery hose 16 leading to an enclosed protective helmet 17 worn by the user. The unit is retained in an upright position on the pack frame by means of a retaining pouch 18 of canvas or other suitable fabric.

Figure 2:
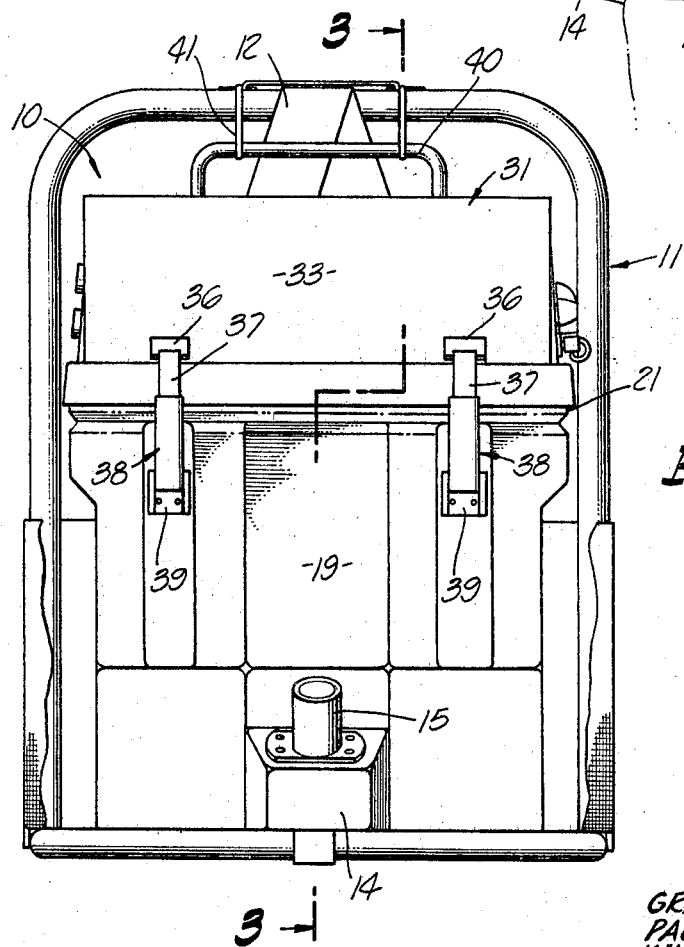
FIG. 2 is an enlarged back elevational view with parts of the retaining pouch broken away.
Figure 3:
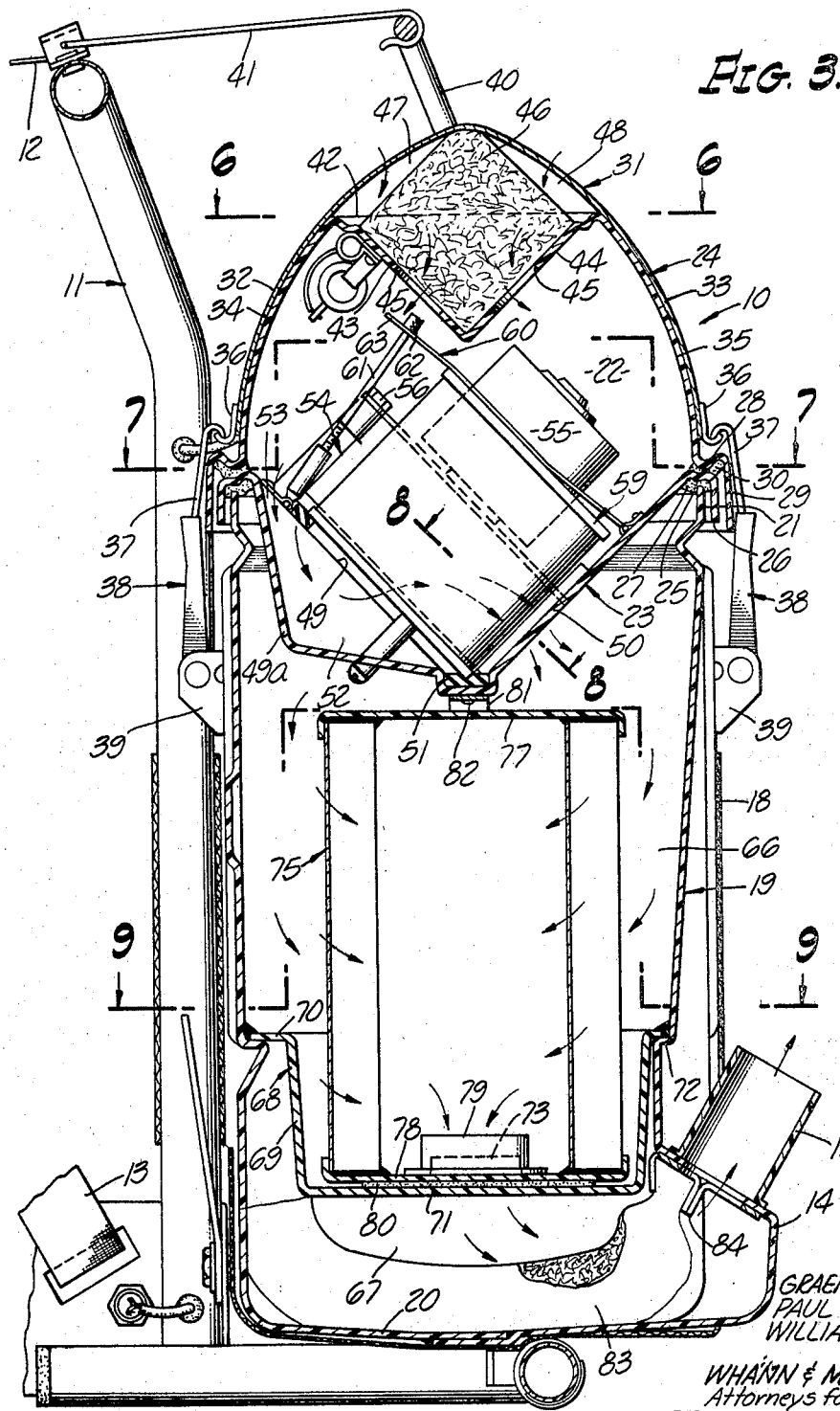
FIG. 3 is an enlarged vertical sectional view through the apparatus, taken substantially on line 3—3 of FIG. 2.

As more specifically shown in FIGS. 2 and 3, the air-conditioning apparatus of the present invention comprises a composite housing structure which includes a substantially rectangular container 19 constructed of suitable material, and is preferably made of a strong durable lightweight plastic which can be molded into the appropriate shape. The container 19 is closed at its bottom by a bottom wall 20, and has an open top defined by a brim 21.

At this open end, there is formed a compartment 22 for isolating the air circulating means and an associated power supply. This compartment is cooperatively formed by a dished upper shelf 23 and a confronting dished cap member 24. At their peripheral margins, the upper shelf and cap member are arranged to interfit so as to orient the members relative to each other and provide sealing surfaces. For this purpose, the upper shelf is provided with a marginal edge area 25 which is outwardly deformed into an edge flange 26 having a position outwardly of the container brim and serving to orient the upper shelf when it is positioned in the open end of the container. A sealing strip or a gasket 27 seals the brim 21 with respect to the marginal edge area 25 of the shelf. The periphery of the cap member is similarly constructed and is provided with a marginal edge area 28 and edge flange 29 having a position outwardly of the edge flange 26 of the upper shelf, and serving to orient the cap member with respect to the upper shelf and upper end of the container. A sealing gasket 30 is positioned between the marginal areas 25 and 28 and serves to seal the periphery of the cap member with respect to the periphery of the upper shelf.

The upper shelf 23 and cap member 24 are releasably retained in assembled relation by means of a canopy 31 having curved front and back walls 32 and 33 respectively which extend downwardly in overlying engagement with similarly curved front and back walls 34 and 35 respectively of the cap member. Adjacent their lower edges, the canopy walls 32 and 33 are provided with one or more hook members 36 which are engageable in each case by an anchor hook member 37 of an adjustable cam-action locking clamp device 38 having a hinge bracket 39 secured to the adjacent container wall. Such clamping devices are conventional and well known. The top of the canopy 31 is provided with a central carrying handle 40 which is releasably engageable by one end of a wire hook member 41, this hook member being swingably connected at its other end to an adjacent frame portion of the backpack frame by any appropriate conventional means. This hook member serves to brace and steady the upper end of the apparatus housing and assist in retaining it in mounted position on the backpack.

Figure 6:
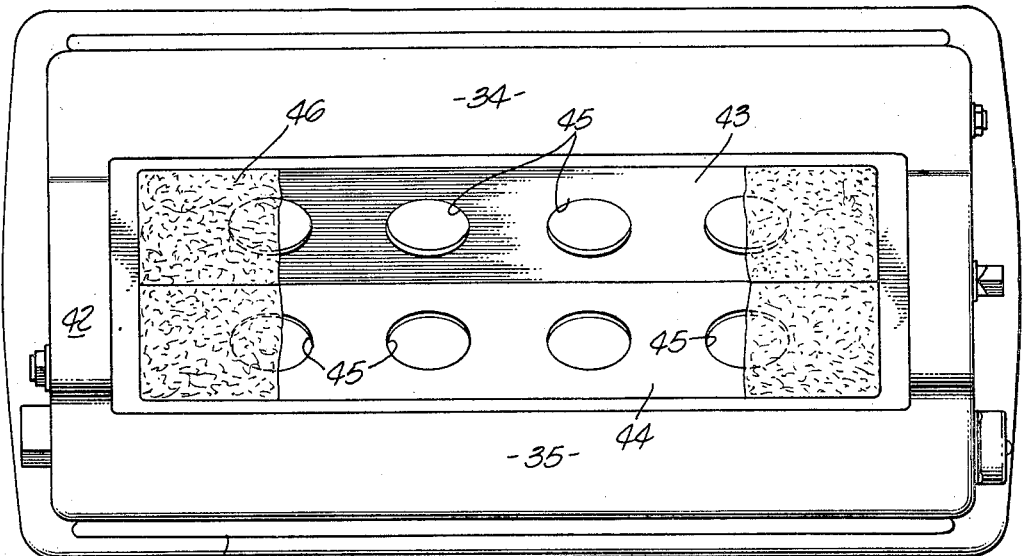
FIG. 6 is a plan view of the cap member of the housing, as seen substantially along the line 6—6 of FIG. 3.

As best seen in FIGS. 3 and 6, the upper ends of the walls 34 and 35 of the cap member are interconnected with an integrally formed upper wall 42, this wall having an axially extending depressed portion with angularly connected walls 43 and 44 containing a plurality of openings 45 therein. The walls 43 and 44 coact to provide a top pan for seatinly receiving therein an elongate pre-filter member 46 of suitable material such as open-cell polyurethane foam which is washable and of such construction that it will filter out larger air-borne particles. As shown in FIG. 3, the pre-filter member is of rectangular cross section, and when seated in the depressed or supporting pan will leave air flow spaces 47 and 48 along each side between the filter material and the upper margins of the adjacent walls 32 and 33 of the canopy. Moreover, at the opposite sides of the canopy there will be air inlet openings at the ends of the pre-filter member between the upper wall 42 areas and the portions of the canopy walls 32 and 33 extending thereabove. The prefilter is thus retained in position by the canopy and due to the cooperative relationship with the upper wall of the cap member provides a protected flow inlet path from the inlet openings to the pre-filter and thence through the openings 45 into the compartment 22.

Figure 7:
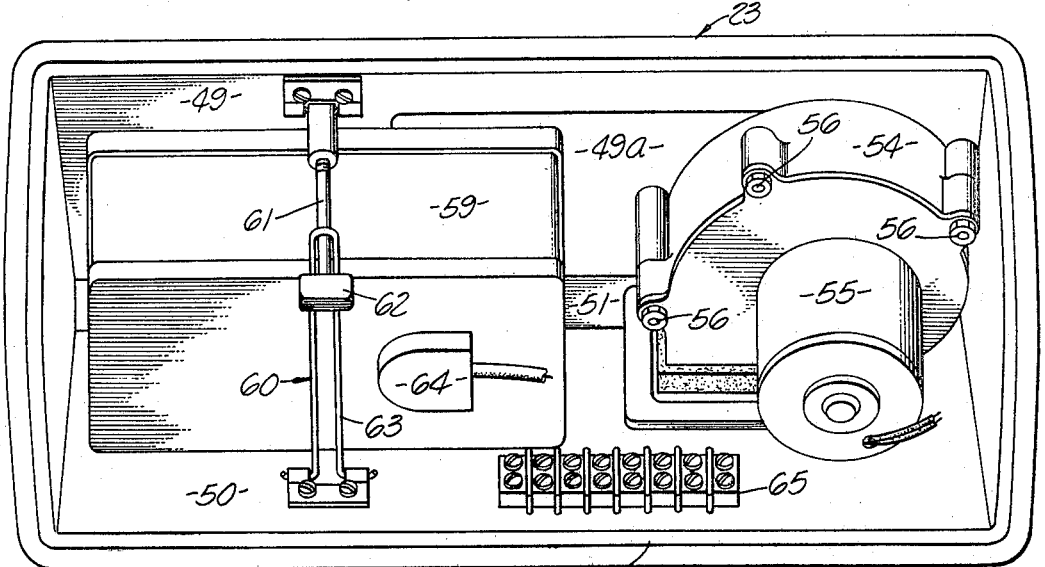
FIG. 7 is a plan view of the upper shelf member with the air moving means and battery supported thereon, as seen substantially from line 7—7 of FIG. 3.
Figure 8:
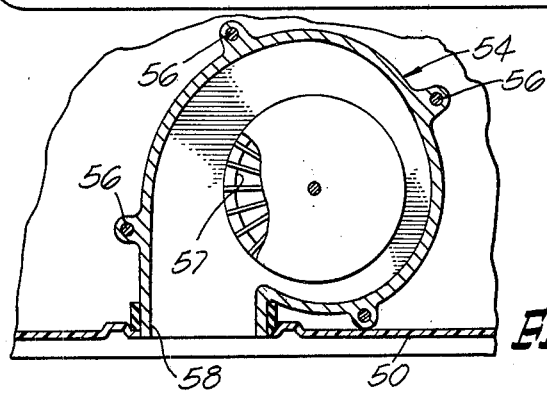
FIG. 8 is a fragmentary section through the fan housing of the air circulating means to show details of construction thereof, taken substantially on line 8—8 of FIG. 3.

Referring now primarily to FIG. 3 and FIG. 7, it will be seen that the upper shelf is also formed with a depressed or a pan portion with angularly positioned walls 49 and 50, these walls at their converged edges being formed with a longitudinally extending shallow trough 51. Moreover, the wall 49 is associated with an outer wall portion 49a with which it cooperates to form a blister compartment 52 having communication through an opening 53 in the wall 49 with the upper side of the shelf 23, and as shown in FIG. 3 with the compartment 22 formed by the upper shelf and the cap member. Air within the compartment 22 which may be received through the openings 45 may therefore flow to the inlet side of an air circulating fan 54 which is operatively driven by coupled electric motor 55. This unit is supported by suitable holding bolts 56 on the walls 49 and 49a in a proper position to place the inlet 57 of the fan casing in communication with the blister compartment 52, and the air outlet 58 of the fan casing in the wall 50, as shown in FIG. 8.

Also mounted on the upper shelf 23 is a battery 59 which provides a source of electrical energy for driving the motor 55. This battery is preferably of the rechargeable nickel-cadmium type and is releasably anchored by conventional holddown means 60 which is shown as comprising a hinged post member 61 having a rotatable head 62 which is adapted to extend through a swingable wire loop member 63 when the head is in one position, and prevent disengagement when the head is rotated to a crosswise position extending across the loop. A quick connection plug 64 permits the battery unit to be quickly connected and disconnected. A terminal strip 65 mounted on the wall 50 provides ready means for interconnecting the motor and battery leads with the other circuit control components as will hereinafter be described in detail.

The container 19 below the upper shelf 23 is separated into a filter compartment 66 and an evaporator compartment 67 by means of an internal partition or bottom shelf 68 of pan-like construction in which an outer wall 69 of generally rectangular configuration is provided at its upper margin with a brim flange 70 and at its lower margin with a bottom wall 71 which is spaced below the brim flange. The brim flange is arranged to conform to the configuration of the container and engage peripherally extending ledge 72 in the container wall so as to suspend the shelf therein, a suitable bonding and sealing medium securing the flange in the mounted position on the ledge. The bottom wall 71 is provided with one or more upstanding tubular protuberances 73 which provide outlet passages 74 from the filter compartment to the evaporator compartment.

The filter compartment 66 is arranged to receive a filter unit 75 of well known standard construction, and which briefly comprises a folded or pleated filter material 76 (FIG. 9) that provides a filter wall which extends between a top filter plate 77 and a bottom filter plate 78. The filter material 76 is such as to remove fine particles of the order of three microns. The filter unit is readily replaceable and is mounted within the filter compartment with upwardly extending nipples 79 formed in the bottom filter plate positioned over the respective protuberances 73, the bottom plate being preferably seated on a gasket member 80. The filter unit is forceably urged against the gasket 80 by means of an elongate bow spring 81 centrally secured as by securing bolts 82 to the bottom of the upper shelf 23 with the ends of the spring bearing against the top filter plate 77, as shown in FIG. 9.

Within the evaporator compartment 67, there is positioned an elongate pad 83 of spongy water saturable material, this pad being supported along one edge by means of a bracket member 84 which is secured by appropriate means, not shown, to an adjacent wall portion of the container. The hose attaching nipple 15 communicates with the evaporator compartment and provides access thereto when it is desired to add water to the evaporated compartment. Due to the sloshing of water within the compartment, the evaporative effect and cooling will be augmented so that it is possible to obtain evaporative cooling of the delivered air by as much as 30° F. depending upon outside humidity.

For purposes of simplicity, the control circuitry for the motor 55 of the air moving means and the battery 59 have been omitted from FIG. 7. However, the control and its features will be now described, reference being had to FIG. 10. The battery 59 is arranged to be recharged from a suitable 12 volt D.C. external charger source as indicated at 85 which is arranged to be connected through a conventional plug-jack connector 86. This connector is of conventional construction and includes a mating plug 86a having a sleeve contact 87 and tip contact 88, and a jack 86b having a ring contact 89, tip engaged contact 90 and associated normally closed contact 91. With the plug inserted into the jack, the contact 91 is opened and the charger circuit connected through conductors 92 and 93 directly to the terminals of the battery 59.

The is also provided an external 12 volt D.C. power source 94 which is connectible through a connector 95 with a driving circuit for the fan motor. It will be observed that the negative side of the external power source is connected through a conductor 96 to one terminal of the fan motor, and that the conductor 93 from the negative side of the battery 59 also connects to this same motor terminal. The other motor terminal connects through a conductor 97 having a fuse 98 therein with a movable contact 99 of a main selector switch $S_1$, the movable contact being selectively positionable in engagement with any one of a plurality of fixed contacts, in this case numbered 1 to 5 inclusive.

With the contact 99 engaged with fixed contact 2, the circuit back to the positive side of the battery 59 is completed through conductor 100, contact 91, tip engageable contact 90, and thence through conductor 92 to the battery. As thus connected, the fan motor will operate from the internal source of power.

Provision is also made for operating the fan motor from the battery 59, but having the additional control feature of a remote control switch 101, which may be of a push-pull type, and is shown in FIG. 1 as being mounted in an easily accessible position on the back frame. This switch is connected through a cable 102 containing wires respectively connected with a sleeve contact 103 and a tip contact 104 of a connection plug 105a adapted for mating connection with a ring contact 106 and tip engageable contact 107 of jack 105b. With the plug and jack connected, the contacts of switch 101 will be connected across fixed contacts 102 of the switch $S_1$ by conductor 108, contact 107, contact 104, the cable 102 containing switch 101, contact 103, contact 106, conductor 109, and thence through conductor 100. With this arrangement, the control of the fan motor, when energized from the battery 59, may readily be changed from remote switch control to continuous running, simply by moving the switch blade 99 from contact 1 to contact 2 of the switch $S_1$.

With the switch blade 99 on the stationary contact 3, the circuit to the motor is disconnected.

With the fan motor connected so as to be energized from the external power source 94, the switch $S_1$ may be set to operate the motor at two different speeds. With the switch blade 99 on the fixed contact 4, the positive side of the external power source will be connected through a fuse 109, conductor 110, a portion of resistor 111, and through a slide contact connection 112 with the fixed contact 4, thence through switch blade 99, conductor 97, and fuse 98 to the other terminal of the motor, the negative side of the external power circuit being connected as heretofore desired to one of the fan motor terminals. This connection provides a higher speed operation than when the switch blade 99 is shifted to the fixed contact 5, in which position the full resistor 111 is connected in the energizing circuit of the motor.

Convenience of control of the motor, battery and operation of the air circulating means is obtained by mounting the control components on end walls of the cap member 24, as shown in FIGS. 4 and 5. In FIG. 4, the fuse 98, fuse 109 and jack connector 86b are shown as mounted on cap end wall 113. The switch $S_1$, external power connector 95 and jack 105b for the remote control switch are mounted on end wall 114 of the cap member. In these positions, the control elements are readily accessible and easily connectible with the components and devices mounted within the compartment 22. From the foregoing description and drawings, it will be clearly evident that the delineated objects and features of the invention will be accomplished.

We claim:
1. A portable backpack self-contained air-conditioning apparatus for supplying conditioned air for personal use, while being carried, comprising:
   (a) an upright housing having an ambient air inlet at its upper end and an air outlet at its lower end adapted for connection with an air delivery hose;
   (b) air filtering means within said housing;
   (c) air moving means within said housing energizable from a battery source carried within said housing, for moving air from said inlet to said outlet via said filter; and
   (d) an evaporator compartment in the lower end of said housing for receiving air in the path of movement of the air from the filter to said outlet, said evaporator compartment containing a water saturated material which is replenishable with water through the delivery hose connection.

2. A portable backpack self-contained air-conditioning apparatus for supplying conditioned air for personnal use, while being carried, comprising:
   (a) an upright housing having an ambient air inlet at its upper end and an air outlet at its lower end adapted for connection with an air delivery hose;
   (b) air filtering means within said housing;
   (c) air moving means within said housing energizable from a battery source carried within said housing, for moving air from said inlet to said outlet via said filter; and
   (d) said housing at its upper end including a cap closure member with an upper wall having a perforate area, a cap retaining canopy extending over said cap and cooperating therewith to provide an underlying shielded air inflow space to said perforate area.

3. Air-conditioning apparatus according to claim 2, wherein said underlying space communicates with air inlet openings at opposite sides of said housing; and including a compressible filter material held in place between the canopy and cap member over said perforate area for filtering the air entering said housing.

4. Air-conditioning apparatus according to claim 2, wherein the cap closure member has a marginal edge flange; an upper shelf member having a marginal edge flange adapted for nesting engagement with the marginal edge flange of said cap member, said cap member and upper shelf member being confrontingly dished and cooperating to form a compartment within which said battery source and air moving means are mounted, the latter having an air discharge outlet opening in said upper shelf member; and means for sealing said flanges relatively to each other and with respect to an associated part of said housing.

5. Air-conditioning apparatus according to claim 4, including a lower shelf in said housing having a peripheral margin in sealing engagement wth respect to an associated part of said housing, said lower shelf having an air outlet opening therein and cooperating with said upper shelf to form a compartment for said filter means, and said filter means having an inlet in communication with the outlet opening in the upper shelf member, and an outlet in communication with the outlet opening in the lower shelf member.

6. Air-conditioning apparatus according to claim 5, including a spring carried by said upper shelf member for engaging said filter means and resiliently urging it towards the lower shelf member.

7. Air-conditioning apparatus according to claim 4, wherein the cap member has opposite end walls at the sides of said housing, and including control and connection components mounted on said end walls for modifying and charging circuit connections of the battery and air moving means within the adjacent compartment.

References Cited

UNITED STATES PATENTS

| | | | |
|---|---|---|---|
| 533,854 | 2/1895 | Loeb | 128—142.6 |
| 1,000,721 | 8/1911 | Cypra | 128—42 |
| 2,332,662 | 10/1943 | Nathanson | 128—142.6 |
| 2,448,068 | 8/1948 | Merrifield | 320—28 |
| 2,649,583 | 8/1953 | Schaeffer | 2—2 |
| 2,813,265 | 11/1957 | Finks | 320—2 X |
| 2,912,159 | 11/1959 | Ganger et al. | 230—259 |
| 2,947,812 | 8/1960 | Parmet et al. | 318—16 X |
| 3,000,191 | 9/1961 | Stark | 62—259 |
| 3,044,016 | 7/1962 | Frihart et al. | 318—16 X |
| 3,049,896 | 8/1962 | Webb | 2—2 X |
| 3,075,400 | 1/1963 | Carlson | 74—472 |
| 3,078,845 | 2/1963 | Kohlmeyer | 128—142.7 |
| 3,140,590 | 7/1964 | Gleockler | 62—459 |
| 3,253,820 | 5/1966 | Seil | 261—29 X |
| 3,286,446 | 11/1966 | Happe et al. | 55—357 |
| 3,290,866 | 12/1966 | Schonrock | 55—258 X |
| 3,316,417 | 4/1967 | Tolmie | 320—2 X |
| 3,323,249 | 6/1967 | Randall | 43—57 |

OTHER REFERENCES

Lonne, German Printed Application No. 1,087,906, printed Aug. 25, 1960 (1 sheet of drawing, 2 pages of specification).

HARRY B. THORNTON, Primary Examiner

D. E. TALBERT, Assistant Examiner

U.S. Cl. X.R.

2—2; 21—53.74; 55—267, 318, 356, 385, 482, 494, 510, 472, 473; 62—259; 128—142.6, 142.7; 261—94; 318—16; 320—2

UNITED STATES PATENT OFFICE
CERTIFICATE OF CORRECTION

Patent No. 3,496,703                    Dated February 24, 1970

Inventor(s) GRAEME S. MacLEOD, ET AL.

It is certified that error appears in the above-identified patent and that said Letters Patent are hereby corrected as shown below:

Column 6, line 56, "desired" should read --described--.

Column 8, line 17, "charging" should read --changing--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents